US011635981B2

(12) United States Patent
Kashyap et al.

(10) Patent No.: US 11,635,981 B2
(45) Date of Patent: Apr. 25, 2023

(54) VIRTUALIZING SHARED COMPUTING RESOURCES

(71) Applicant: Microsoft Technology Licensing, LLC, Redmond, WA (US)

(72) Inventors: Abhilash Ravi Kashyap, San Jose, CA (US); Brennan Alexander Watt, San Clemente, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 17/002,702

(22) Filed: Aug. 25, 2020

(65) Prior Publication Data

US 2022/0066807 A1 Mar. 3, 2022

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45579* (2013.01); *G06F 2009/45583* (2013.01); *G06F 2009/45595* (2013.01)

(58) Field of Classification Search
CPC ............... G06F 9/45558; G06F 9/5077; G06F 2009/45579; G06F 2009/45583; G06F 2009/45595
See application file for complete search history.

(56) References Cited

U.S. PATENT DOCUMENTS

| | | | | |
|---|---|---|---|---|
| 2006/0282637 | A1* | 12/2006 | Yamauchi | ............... G06F 3/067 711/170 |
| 2011/0119748 | A1* | 5/2011 | Edwards | ............. G06F 9/45558 718/1 |
| 2013/0111349 | A1* | 5/2013 | Yan | ..................... H04L 41/0806 715/738 |
| 2014/0156960 | A1* | 6/2014 | Simoncelli | ............ G06F 21/604 711/163 |
| 2015/0317088 | A1* | 11/2015 | Hussain | ............... G06F 3/0688 711/103 |

(Continued)

OTHER PUBLICATIONS

NVMexpress; NVMe namespace; Aug. 3, 2020; https://web.archive.org/web/20200803122307/https://nvmexpress.org/resources/nvm-express-technology-features/nvme-namespaces/ (Year: 2020).*

(Continued)

*Primary Examiner* — Dong U Kim
(74) *Attorney, Agent, or Firm* — Ray Quinney & Nebeker P.C; James Bullough

(57) ABSTRACT

The present disclosure relates to systems, methods, and computer-readable media for virtualizing storage resources on non-volatile memory in a way that enables virtual machines on a computing device to efficiently access computing resources across multiple partitions of multiple non-volatile memory devices. For example, systems disclosed herein facilitate establishing a binding (e.g., a physical function, such as a single root input/output virtualization (SR-IOV) or a multi-physical function (MPF)) between the virtual machine(s) and solid state drive (SSD) devices. The systems disclosed herein further involve using a virtual volume manager on an operating system of the virtual machine(s) to implement features and functionality of the virtual machine(s) in accordance with configuration data unique to the virtual machine(s).

20 Claims, 5 Drawing Sheets

(56) References Cited

U.S. PATENT DOCUMENTS

2015/0363240 A1* 12/2015 Koizumi ............ G06F 11/3447
718/1

OTHER PUBLICATIONS

"International Search Report and Written Opinion Issued in PCT Application No. PCT/US2021/030995", dated Jul. 22, 2021, 10 Pages.

* cited by examiner

VIRTUALIZING SHARED COMPUTING RESOURCES

BACKGROUND

Recent years have seen a precipitous rise in the use of computing devices (e.g., mobile devices, personal computers, server devices, cloud computing systems) to receive, store, edit, transmit, or otherwise utilize digital data. For example, it is now common for individuals and businesses to store and/or process massive quantities of data on local computing devices and/or on remote cloud computing systems. As demand for increased storage and memory capacity on computing devices increases, innovations in technology associated with storing and processing data has similarly improved and become more capable.

As cloud computing continues to grow in popularity, managing increased demands on storage capacity and processing resources has become increasingly difficult. For example, in an effort to provide additional resources at affordable prices, many systems and devices enable sharing of resources between multiple customers. Indeed, many conventional systems host virtual machines associated with different customers that enable the virtual machines to share computing resources on individual computing devices. Enabling shared access to computing resources, however, suffers from a number of problems and drawbacks.

For example, sharing computing resources may often result in a noisy neighbor problem in which a more aggressive customer or tenant interferes with usage of the computing resources by other customers or virtual machines. In addition, while many conventional systems simply reserve specific computing capacity to specific customers or tenants, this can result in limited bandwidth and other computing resources allocated to specific virtual machines, and often causes inefficient utilization of computing resources. Moreover, and as will be discussed in further detail below, conventional solutions that implement virtualization using primarily central software management tools generally involve a robust development pipeline and significant computing overhead. Indeed, conventional virtual machine management tools often involve centrally maintaining numerous hardware configurations and processing a significant number of system calls to enable virtual machines of different types to share resources and operate on common devices, which can slow operation and add significant storage and computing costs.

These and other problems exist in connection with implementing different virtual machines that share computing resources.

DETAILED DESCRIPTION

Figure 1:
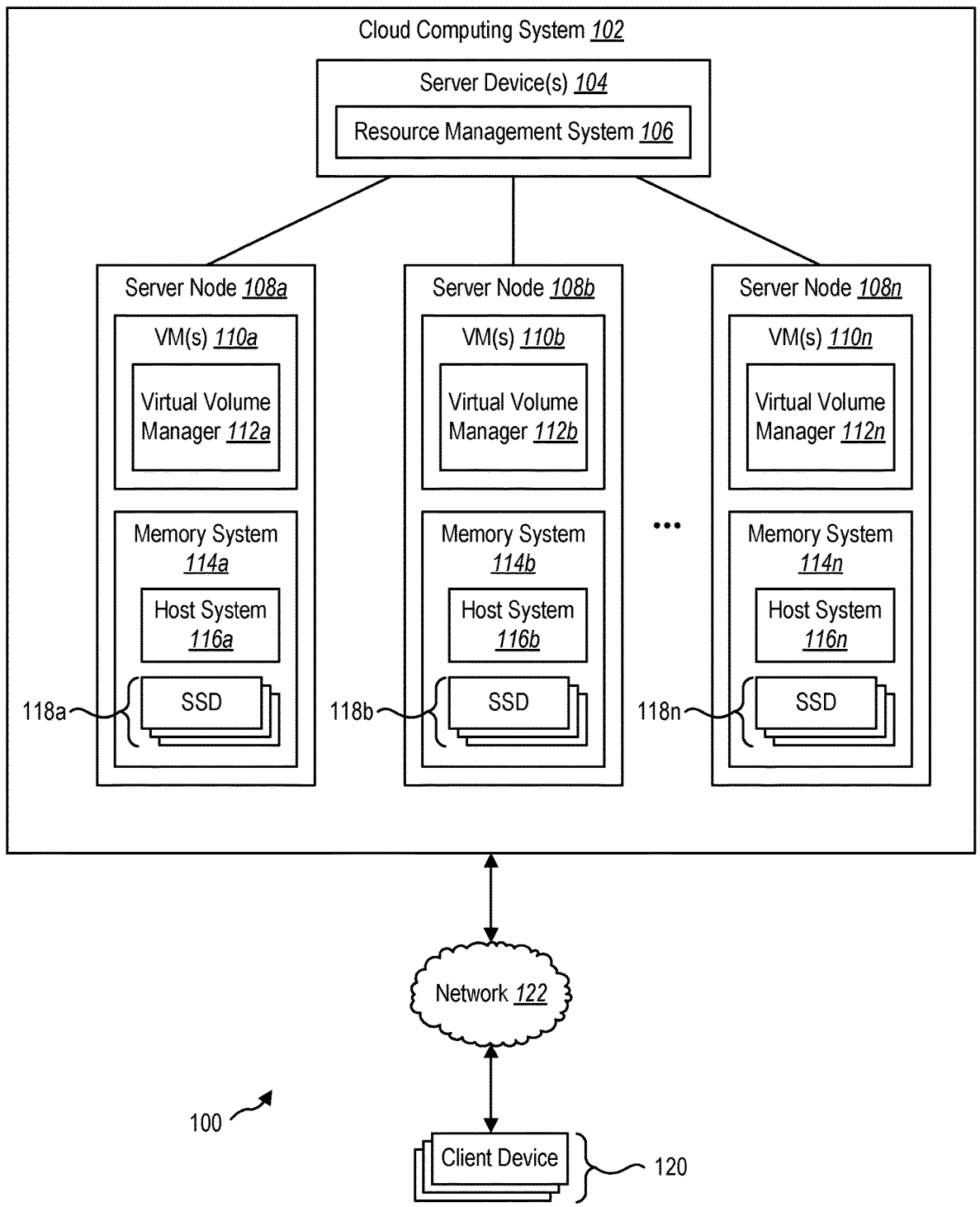
FIG. 1 illustrates an example environment of a cloud computing system including virtual volume managers implemented across a number of virtual machines in accordance with one or more embodiments.

The present disclosure is generally related to virtualizing storage resources on solid state drive (SSD) devices (and other non-volatile memory systems) in a way that enables the virtual machine(s) to efficiently access computing resources across multiple SSD devices using a variety of computing applications. In particular, based on configuration data for a virtual machine, a virtual machine may be associated (hardware-bound) to a plurality of SSD devices using physical functions that causes a portion of the SSD devices (e.g., namespaces) to be virtualized to the virtual machine(s) via physical functions. In addition to binding the virtual machines and SSD devices, a virtual volume manger may be implemented on the virtual machine(s) to access data on the SSD devices in accordance with the configuration data for the virtual machine. The systems described herein provide a flexible and secure configuration that enables the virtual machines to directly access partitioned portions of the SSD devices without interfering with usage by other virtual machines.

By way of example, and as will be discussed in further detail below, this disclosure describes a virtual volume manager implemented on a virtual machine on a computing device (e.g., a server node on a cloud computing system). The systems described herein may receive configuration data for the virtual machine including instructions associated with managing computing resources (e.g., processing and/or storage resources) on a plurality of non-volatile storage devices (e.g., peripheral component interconnect express (PCIe) devices, SSD devices). The systems described herein facilitate establishing bindings between the virtual machine and a number of non-volatile storage devices. The systems described herein further facilitate implementing, on an operating system of the virtual machine (e.g., a guest operating system), the virtual volume manager being configured to access the non-volatile storage devices in accordance with the received configuration data.

The present disclosure includes a number of practical applications that provide benefits and/or solve problems associated with virtualizing computing resources to virtual machines to enable the virtual machines to share computing resources without interfering with one another. Examples of these applications and benefits are discussed in further detail below.

For example, by virtualizing computing resources in accordance with one or more embodiments described herein, the systems described herein can provide consistent computing resources while avoiding the noisy neighbor problem caused by other tenants or customers that may be sharing the same computing resources. For instance, systems described herein may bind or otherwise associate partitioned namespaces of SSD devices to multiple virtual machines using a variety of virtualization techniques. By way of example, in one or more embodiments described herein, the systems may bind the virtual machines and partitioned resources by way of single-root input/output virtualization (SR-IOV) or multi-physical function (MPF) techniques.

In addition to reducing or otherwise eliminating cross-customer interference from aggressive tenants, the systems described herein provide enhanced flexibility in implementing a variety of configurations associated with different types of virtual machines. For example, by implementing a virtual volume manager locally on a virtual machine, a greater variety of virtual machines capable of implementing different configurations is possible. To illustrate, a first virtual machine may prioritize processing performance by implementing a configuration in which computing resources across different SSD devices are concurrently used to boost bandwidth or throughput for the particular virtual machine. Meanwhile, on the same computing device, a second virtual machine may prioritize redundancy or boost failover by duplicating a storage volume or otherwise maintaining redundant data on different SSD devices. In both cases, the virtual machines can provide a single storage volume view to a client while optimizing different types of performance based on locally implemented configuration data on a virtual volume manager of the virtual machine(s). Indeed, as will be discussed in further detail herein, locally implementing configurations on respective virtual volume managers greatly enhances flexibility for any number of virtual machines.

Moreover, the systems described herein provide the above benefits while significantly reducing processing overhead and latency in performing various computing and storage functions. For example, where a conventional host system may include a hypervisor and host operating system capable of enabling various performance and/or failover benefits using complex and often expensive software solutions, these existing systems typically involve a significant number of system calls between the virtual machines and the host operating system and/or hypervisor. These system calls, in addition to the expense of hosting a robust central software solution, can cut down on available computing resources. For instance, as more virtual machines associated with different customers are loaded onto a device, an increased number of system calls to accommodate each customer can result in slower access speeds, lower throughput generally, and other limitations on computing performance for the virtual machines.

In addition to improving performance by reducing a number of system calls to a host system, distributing management of the virtual machines to locally implemented virtual volume managers and guest operating systems also reduces processing overhead in other ways. For instance, by performing hardware virtualization in accordance with one or more embodiments, a greater number of virtual machine types may be deployed without locally managing specific hardware configurations on the host system. This reduces expense of supply chain management resources, allocation resources, idle resources, and other computing expenses that occur as a result of centrally maintaining hardware configurations for a variety of virtual machines.

As illustrated in the foregoing discussion, the present disclosure utilizes a variety of terms to describe features and advantages of the systems herein. Additional detail is now provided regarding the meaning of some example terms.

For example, as used herein, a "cloud computing system" refers to a network of connected computing devices that provide various services to customer devices (e.g., client devices, network devices). For instance, as mentioned above, a distributed computing system can include a collection of physical server devices (e.g., server nodes) organized in a hierarchical structure including clusters, computing zones, virtual local area networks (VLANs), racks, fault domains, etc. The cloud computing system may refer to a private or public cloud computing system. In one or more embodiments described herein, a computing device or host device refers to a server node or any network device on a cloud computing system.

As used herein, a "virtual machine" refers to an emulation of a computer system on a server node that provides functionality of one or more applications or services on the cloud computing system. Virtual machines can provide functionality needed to execute one or more operating systems. In addition, virtual machines can make use of hypervisors on processors of server devices that support virtual replication of hardware. It will be understood that while one or more specific examples and implementations described herein relate specifically to virtual machines, features and functionality described in connection with binding or otherwise virtualizing computing resources for virtual machines may similarly refer to other types of services or cloud-based resources implemented on server nodes or other computing devices.

As used herein, "configuration data," a "machine configuration," or "hardware configuration" may refer to specifications or characteristics associated with operation of a virtual machine on a computing device. For example, configuration data may refer to any information or instructions that the virtual machine may implement in performing various tasks in connection with data or other computing resources maintained on a computing device. In one or more embodiments, configuration data refers to instructions associated with prioritizing specific tasks or performance specifications. For instance, configuration data may include instructions for prioritizing redundancy or failover, thus causing a virtual volume manager to maintain redundancy across multiple namespaces on multiple SSD devices. In addition, or as an alternative, configuration data may include instructions for increasing computing speed or throughput (or other computing performance specification), thus causing a virtual volume manager to concurrently use computing resources (e.g., parallel resources) across multiple SSD devices. In one or more embodiments, the configuration data includes instructions associated with virtualizing hardware on the computing device to the respective virtual machine.

As will be discussed in further detail herein, a virtual machine may be associated with one or multiple SSD devices by way of a binding between the virtual machine and the SSD devices. As used herein, a "binding" may refer to any physical or virtual function or virtualization of hardware from the perspective of a virtual machine. In one or more embodiments, the binding may refer to a physical function, which may refer to a construct or function of a system that supports a virtualization interface between a virtual machine and the SSD device(s) (or other computing resource device (s)). For instance, in one or more implementations, a physical function may refer to a peripheral component interconnect express (PCIe) function that supports a virtualization interface between the virtual machine and SSD device(s).

In addition, as will be discussed in further detail below, the physical function may refer to a variety of different virtualization types. For instance, in one or more embodiments, the physical function refers to a single root input/output virtualization (SR-IOV) in which the SSD or PCIe resource is exposed via a single interface that exposes virtual functions of the SSD device. As another example, in one or more implementations, the physical function refers to a multi-physical function including multiple functions between the virtual machine and SSD devices (e.g., non-volatile memory express (NVMe) SSDs).

Additional detail will now be provided regarding examples of various systems in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 may include one or more server device(s) 104 having a resource management system 106 thereon.

In one or more embodiments, the resource management system 106 includes features and functionality that enables deployment of virtual machines that operate in accordance with specific configurations. For instance, the resource management system 106 may provide specifications for different types of virtual machines to a host system on a computing node that facilitates allocating computing resources on one or more SSD devices of the computing node. In one or more embodiments, the resource management system 106 includes one or more control planes for managing resources across any number of nodes on the cloud computing system 102. The resource management system 106 may refer to localized control planes and associated management systems for controlling resources at specific datacenters and/or node clusters. Alternatively, the resource management system 106 may refer to a centralized resource system responsible for management of computing resources across any number of nodes of the cloud computing system 102.

As shown in FIG. 1, in addition to the server device(s) 104, the cloud computing system 102 may include any number of server nodes 108a-n. While not shown in FIG. 1, the server nodes 108a-n may be organized within node clusters or other grouping of devices or networks. For instance, the server nodes 108a-n may be grouped by geographic location (e.g., a region of a node cluster). In one or more embodiments, the server nodes 108a-n are implemented across disparate geographic locations (e.g., on different datacenters or on different server racks including one or multiple node clusters).

The server nodes 108a-n may refer to a variety of computing devices or various network devices. For example, in one or more embodiments, the server nodes 108a-n refer to server devices having compute cores implemented thereon capable of hosting virtual machines and providing various services to customers of the cloud computing system 102.

As shown in FIG. 1, each of the server nodes 108a-n may include one or more virtual machines 110a-n. For instance, a first server node 108a may include a first set of virtual machine(s) 110a implemented thereon. The set of virtual machine(s) 110a may include multiple virtual machines of similar types (e.g., that provide similar services or have similar virtual machine configurations). Alternatively, the virtual machine(s) 110a may include virtual machines of different types and operating in accordance with different sets of configuration data. Each of the additional virtual machines 110b-n may have similar features and functionality as the first set of virtual machine(s) 110a on the first server node 108a. Additional detail in connection with virtual machines operating in conjunction with different configuration data will be discussed in further detail below.

Each of the virtual machines 110a-n may include virtual volume managers 112a-n implemented thereon. The virtual volume managers 112a-n may be implemented on guest operating systems of the virtual machines 110a-n configured to facilitate various features and functionalities of the virtual machines 110a-n in accordance with sets of configuration data. As mentioned above, the configuration data may include instructions for managing and otherwise utilizing computing resources on the respective server nodes 108a-n. Additional detail in connection with the virtual volume managers 112a-n will be discussed below in connection with FIGS. 2-3.

As further shown, each of the server nodes 108a-n include memory systems 114a-n having host systems 116a-n implemented thereon. Each of the host systems 116a-n may include similar features and functionality as one another. For example, as will be discussed in further detail below, a first host system 116a on the first server node 108a may include a hypervisor configured to create and host virtual machines on the server node 108a. As will be discussed in further detail herein, the hypervisor may facilitate creating the virtual machines and handoff or otherwise distribute at least a portion of control of the virtual machine operation to a virtual volume manager having a guest operating system implemented thereon for facilitating operation of the virtual machine in accordance with a set of configuration data.

The host system 116a may additionally include an operating system (e.g., a host operating system) that facilitates basic operations and other functions of the host system 116a, such as scheduling tasks, executing applications, etc. In one or more embodiments, the operating system refers to a host operating system implemented on the host system 116a that operates in conjunction with guest operating systems implemented on each of the respective virtual machine(s) 110a.

As further shown in FIG. 1, the memory systems 114a-n include SSD devices 118a-n implemented thereon. The SSD devices 118a-n may include similar configurations of SSD devices 118a-n on each of the respective memory systems 114a-n. For example, a first SSD device(s) 118a may include any number of non-volatile storage devices capable of maintaining data and providing access to the data to any number of the virtual machines 110a on the associated server node 108a. As discussed in further detail below, the SSD device(s) 118a may include partitioned storage that are selectively accessible to respective virtual machines 110a by way of physical functions that have been established between the virtual machines 110a and respective SSD device(s) 118a.

While one or more embodiments described herein relate specifically to SSD devices implemented on server nodes, it will be appreciated that other configurations of storage devices and associated computing devices may be used in accordance with one or more embodiments of the present disclosure. For example, the server nodes may refer to any computing devices capable of hosting virtual machines thereon. This may include server devices on the cloud computing system 102 in accordance with one or more examples described herein or, alternatively, other types of computing devices on any type of network of devices. In addition, one or more embodiments may specifically describe features related to providing selective access to data via SSD devices, other types of non-volatile devices may similarly be used in accordance with one or more embodiments described herein. Accordingly, features and functionalities described in connection with virtual machines and SSD devices on server nodes may similarly apply to other types of computing devices and other types of non-volatile memory devices.

In addition to the cloud computing system 102 and associated components, the environment 100 may include a plurality of client devices 120 in communication with the cloud computing system via a network 122. For example, the client devices 120 may communicate with the server nodes 108a-n via the network 118. The client devices 120 may refer to various types of computing devices including, by way of example, mobile devices, desktop computers, server devices, or other types of computing devices. The network 122 may include one or multiple networks that use one or more communication platforms or technologies for transmitting data. For example, the network 122 may include the Internet or other data link that enables transport of electronic data between respective client devices 120 and devices of the cloud computing system 102.

As mentioned above, the components illustrated in FIG. 1 may provide features and functionality related to establishing a physical function between a virtual machine and one or more SSD devices. This may be done in a way that offloads processing from the host systems 116a-n to the virtual volume managers 112a-n on the respective virtual machines 110a-n. Additional detail in connection with an example implementation will now be discussed in connection with an example server node having a virtual machine deployed thereon.

Figure 2:
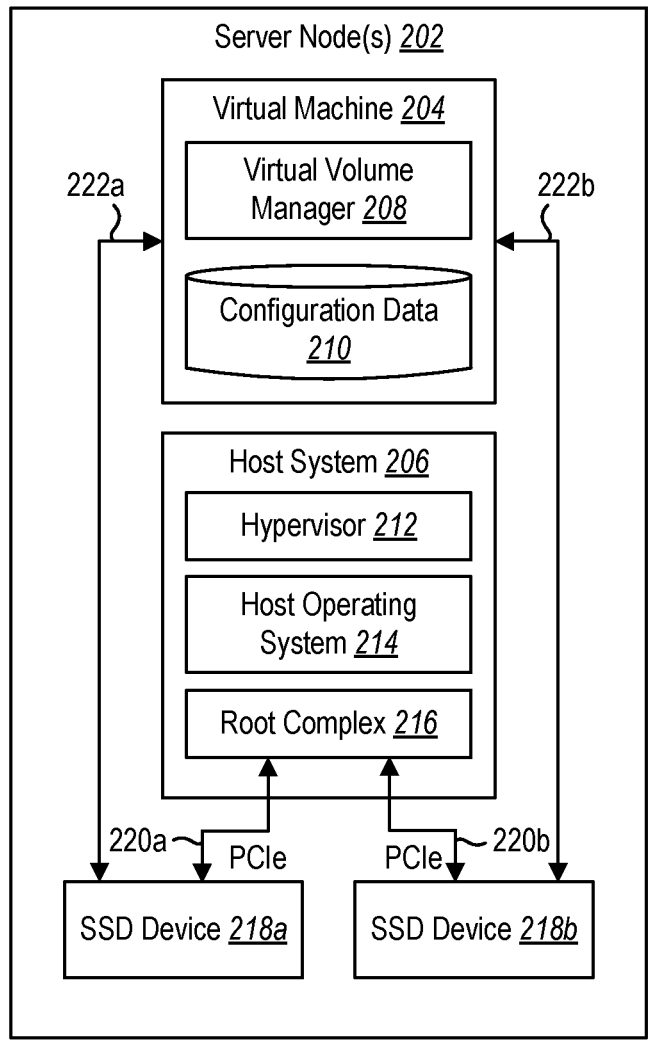
FIG. 2 illustrates an example implementation in which a virtual machine is bound to different solid state drive (SSD) devices in accordance with one or more embodiments.

For example, FIG. 2 illustrates an example server node 202 including a virtual machine 204 and a host system 206. The server node 202 may refer to a server node of a cloud computing system 102 as discussed above in connection with FIG. 1. Alternatively, the server node 202 may refer to any computing device capable of hosting a virtual machine 204 thereon that operates in conjunction with a host system 206 in accordance with one or more embodiments described herein.

As shown in FIG. 2 the virtual machine 204 includes a virtual volume manager 208 and a set of configuration data 210. As noted above, the virtual volume manager 208 refers to a module on the virtual machine 204 that is capable of managing features and functionality of the virtual machine 204, some of which may traditionally be performed by the hypervisor on the host system 206. For example, in one or more embodiments described herein, the virtual volume manager 208 may reside in an operating system of the virtual machine 204 to schedule tasks, execute functions, access data on non-volatile storage devices, and otherwise perform actions of the virtual machine 204 in accordance with the configuration data 210 (e.g., instructions of the configuration data 210).

As shown in FIG. 2, the host system 206 includes a number of components including a hypervisor 212, a host operating system 214, and root complex 216. As discussed above, the hypervisor 212 and host operating system 214 may be configured to create and deploy virtual machines on the server node 202 in accordance with received configuration data 210. For example, in one or more embodiments described herein, the hypervisor 212 can create one or more virtual machines and cause the virtual machines to be configured to perform tasks in accordance with respective configurations data 210. In the illustrated example, the hypervisor 212 may create the virtual machine 204 having the virtual volume manager 208 thereon and provide permissions to the virtual volume manager 208 associated with accessing portions of SSD devices (e.g., establishing bindings).

In cooperation with the hypervisor 212, the host operating system 214 can manage operation of the hardware on server node 202 including the SSD devices (discussed below). In one or more embodiments described herein, the host operating system 214 may be tasked with performing any features and functionality that fall outside of the permissions that have been set for the virtual volume manager 208 on the virtual machine 204. In one or more embodiments, the host operating system 214 facilitates the initial bindings between the virtual machine 204 and various SSD devices.

As further shown in FIG. 2, the host system 206 includes a root complex 216. The root complex 216 may include features and functionality for enabling components of the host system 206 (and virtual machines 204) to communicate with or otherwise interface with various endpoints. The root complex 216 may include a variety of switches, multiplexers, ports (e.g., root ports) and other hardware that enable the host system 206 (and virtual machine 204) to communicate with SSD devices or other types of endpoints (e.g., PCIe endpoints). Further, while one or more embodiments described herein relate specifically to a root complex 216 in a PCIe framework including PCIe interfaces for communicating with SSD devices, the host system 206 may utilize other implementations of hardware the facilitate communication between devices of the server node 202 and a variety of computing endpoints or types of non-volatile storage devices.

As mentioned above, and as shown in FIG. 2, the server node(s) 202 may include multiple SSD devices 218a-b. The SSD devices 218a-b may be coupled to the root complex 216 via PCIe links 220a-b. The SSD devices 218a-b may refer to independent storage devices that are intended to operate independent from one another. The SSD devices 218a-b may have similar specifications (e.g., storage volumes, access speeds) and identical functionalities. Alternatively, the SSD devices 218a-b may provide different types or quantities of computing resources capable of accommodating different types of virtual machines and/or different sets of instructions indicated by associated configuration data.

As shown in FIG. 2, computing resources of the SSD devices 218a-b may be exposed to the virtual machine 204 by way of virtual bindings 222a-b. For example, a first binding 222a may be established between the virtual machine 204 and the first SSD device 218a. In addition, a second binding 222b may be established between the virtual machine 204 and the second SSD device 218b. In one or more embodiments, the bindings 222a-b are established by the host operating system 214 in conjunction with creating the virtual machine 204 on the server node 202. Moreover, as discussed below, the bindings 222a-b may be established in accordance with the configuration data 210 indicating specifications and instructions associated with managing computing resources on the SSD devices 218a-b.

The bindings 220a-b may refer to a variety of links between the virtual machine 204 and SSD devices 208a-b. For example, in one or more embodiments, the bindings 220a-b refer to physical functions established between the virtual machine 204 and the SSD devices 208a-b that enables the virtual machine 204 to obtain access to a storage volume or portion of a storage volume on the respective SSD devices 208a-b. In one or more embodiments, the bindings 220a-b include a PCIe physical function that enables the virtual machine 204 to detect or enumerate a corresponding PCIe endpoint, which may include SSD devices 218a-b coupled to the root complex 216 via a PCIe interface. These bindings 220a-b may act as a link between the virtual machine 204 and the SSD devices 218a-b from the perspective of the virtual machine 204 similar to a communication link that the PCIe links 220a-b provide between the host system 206 and the SSD devices 208a-b.

The virtual machine 204 may additionally utilize a variety of physical functions when establishing the bindings 222a-b. For example, in one or more implementations, the bindings 222a-b include SR-IOVs between the virtual machine 204 and SSD devices 218a-b. In particular, each binding may refer to a respective SR-IOV interface between the virtual machine 204 and partitioned portion of the respective SSD device(s). Alternatively, in one or more embodiments, the bindings 222a-b include MPFs between the virtual machine 204 and SSD devices 218a-b. In particular, each binding may refer to a respective MPF between the virtual machine 204 and discrete portion of the respective SSD device(s).

As will be discussed in further detail below, the bindings 222a-b (e.g., the physical functions) may act as a physical interface between the virtual machine 204 and the SSD devices 218a-b that expressly limit a domain of storage space that the virtual machine 204 may access. For instance, where the SSD devices 218a-b include partitioned portions of storage (e.g., namespaces), the bindings 222a-b may selectively provide access to only the portions of storage that have been identified when establishing the bindings 222a-b between the virtual machine 204 and the corresponding partitioned portions of the SSD devices 218a-b. Establishing the bindings 222a-b using physical functions enables the hardware of the SSD devices 218a-b to limit access to a specific partitioned portion of the storage space corresponding to the physical function(s).

In one or more embodiments, the virtual machine 204 provides a virtualization of one or more storage volumes from the SSD devices 218a-b in accordance with the configuration data. For example, in one or more embodiments, the virtual machine 204 provides a single storage volume based on two or more discrete partitions of storage space from the two (or more) SSD devices 208a-b. For instance, where the configuration data includes instructions to combine storage from the two different SSD devices 218a-b within a single volume, file, or other storage construct, a customer of the virtual machine 204 may view a single storage volume that includes a combination of data maintained on the two SSD devices 218a-b. In accordance with one or more embodiments discussed herein, this combination and virtualization of computing resources within a single volume or virtualization may be performed by the virtual volume manager 208 (e.g., a guest operating system on the virtual volume manager) as an alternative to a hypervisor 212 facilitating the virtualization in accordance with the configuration data for the virtual machine 204.

As mentioned above, and as will be discussed by way of example below in connection with FIG. 3, the configuration data may include sets of rules or instructions for prioritizing different types of performance. For instance, the virtual machine 204 may have a particular function or characteristic based on the configuration data that facilitates differences in utilization of the computing resources (e.g., the SSD devices 218a-b). As shown in FIG. 2, the configuration data may be included or otherwise maintained by the virtual machine 204 to enable the virtual volume manager 208 to locally execute tasks and actions in accordance with functionality defined or otherwise included within the configuration data.

As a first example, in one or more embodiments, the configuration data 210 includes instructions for prioritizing redundancy (e.g., failover) of one or more storage volumes. In particular, based on these instructions for prioritizing redundancy, the virtual volume manager 208 may cause data to be replicated across both the first SSD device 218a and the second SSD device 218b. In accordance with the configuration data 210, therefore, the virtual volume manager 208 can ensure 2x failover capacity for the data stored or otherwise maintained on the SSD devices 218a-b. In this way, where one of the SSD devices 218a-b goes down, the virtual volume manager 208 may nonetheless have uninterrupted access to data stored on one of the two SSD devices 218a-b.

As a second example, in one or more embodiments, the configuration data 210 includes instructions for prioritizing bandwidth, throughput, or other metric of computing performance for the one or more storage volumes. In particular, based on the instructions for prioritizing computing performance, the virtual volume manager 208 may concurrently utilize both volumes on the respective SSD devices 218a-b. While this may not prevent the virtual volume manager 208 from losing data in the event of one of the SSD devices 218a-b going down, it may nonetheless ensure faster performance of tasks performed by the virtual machine 204. In addition, where a particular task or functionality of the virtual machine 204 does not depend on redundancy, this configuration may represent a more efficient utilization of available computing resources.

As a third example, in one or more embodiments, the configuration data 210 includes instructions having a combination of different priorities for the virtual machine 204. For example, the configuration data 210 may include instructions for prioritizing a combination of computing performance and redundancy. In this example, the virtual volume manager 208 may duplicate data across both the SSD devices 218a-b as well as utilize a greater partition (e.g., multiple partitions or namespaces) of the SSD devices 218a-b to ensure faster performance while also ensuring 2x failover capacity. In addition, where the server node 202 includes additional SSD devices, the virtual volume manager 208 can utilize additional bindings between the virtual machine 204 and additional SSD devices to further implement specific instructions of the configuration data 210.

While FIG. 2 illustrates an example implementation showing a server node(s) 202 including a single virtual machine 204 having two bindings 222a-b with two available SSD devices 218a-b, it will be understood that any number of configurations having different sets of instructions may be implemented on one or multiple server devices. For example, the configuration data 210 may include different instructions corresponding to specific types of virtual machines 204. In addition, the configuration data 210 may prioritize different performance specifications based on information received from customers upon creation of or deployment of the virtual machines For example, as mentioned above, a cloud computing system 102 may include a resource management system 106 having one or more control planes thereon that are configured to deploy or otherwise implement virtual machines on respective server nodes. In one or more embodiments, a control plane or central resource system may receive a selection of a particular virtual machine type or set of specifications for a virtual machine and initiate a deployment of the virtual machine on the server node(s). In addition, the control plane and/or central resource system can provide the configuration data to the server node(s) 202 for use in creating the virtual machine 204 and implementing the virtual volume manager 208 thereon.

Figure 3:
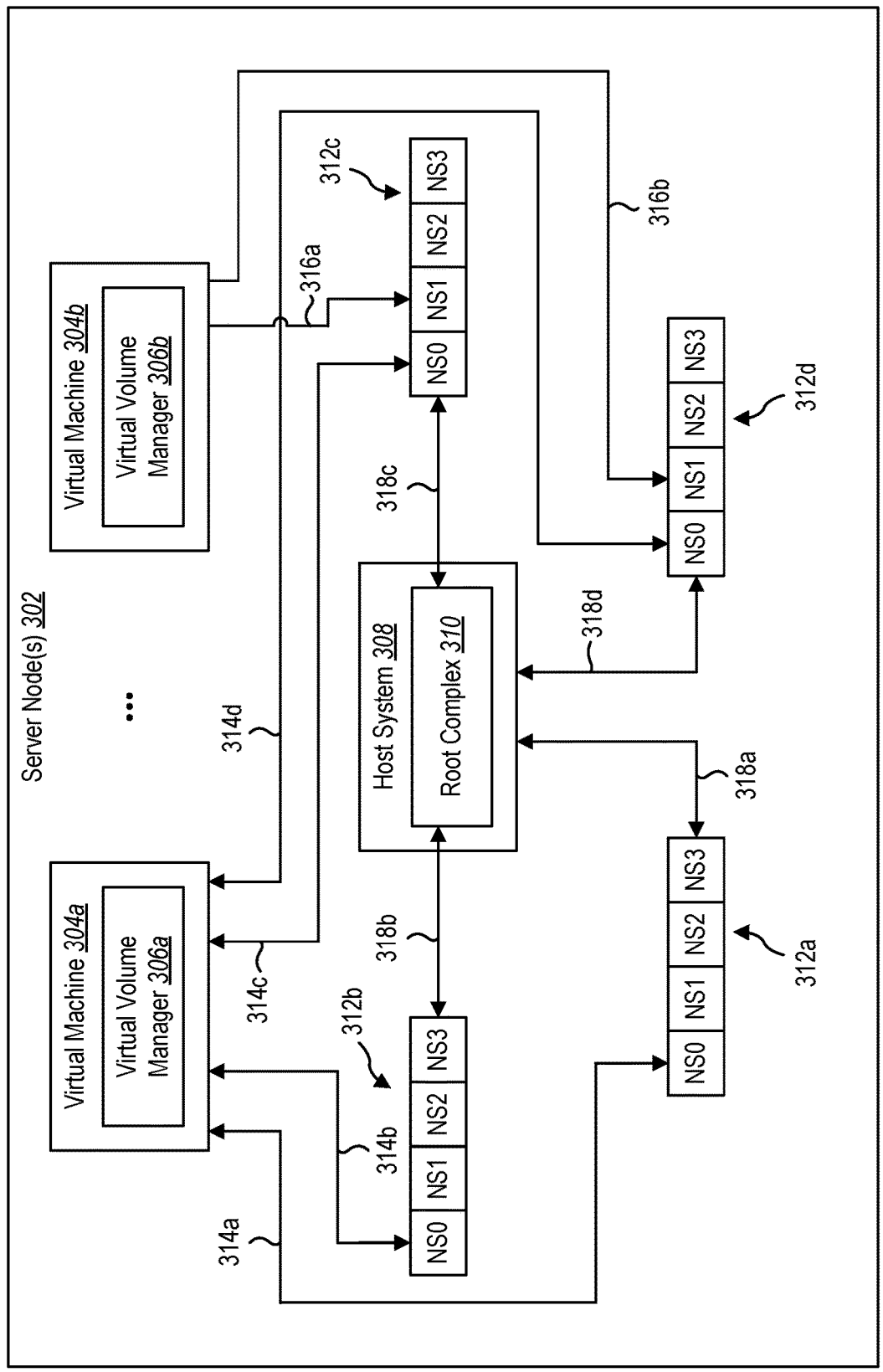
FIG. 3 illustrates an example implementation in which different virtual machines on a computing device are bound to namespaces on different SSD devices in accordance with one or more embodiments.

FIG. 3 illustrates another example implementation in which a plurality of virtual machines are implemented on a server node in accordance with one or more embodiments described herein. In particular, as shown in FIG. 3, a server node(s) 302 may include multiple virtual machines 304a-b having virtual volume managers 306a-b implemented thereon. The virtual machines 304a-b and virtual volume managers 306a-b may include similar features and corresponding component discussed above in connection with FIGS. 1 and 2.

As further shown, the server node(s) 302 may include a host system 308 having a root complex 310 implemented thereon. While not shown in FIG. 3, the host system 308 may additionally include a hypervisor and host operating system as discussed in connection with other examples configured to perform acts related to creating the virtual machines 304*a-b* and establishing bindings with respective storage volumes on the host system 308. For ease in explanation, a root complex 310 is shown showing links (e.g., PCIe links) between the host system 308 and a plurality of SSD devices on the server node 302.

As shown in FIG. 3, the server node(s) 302 includes a plurality of SSD devices 312*a-d*. Each of the SSD devices 312*a-d* may include allocable computing resources for use by any number of virtual machines deployed on the server node(s) 302. As mentioned above, while the SSD devices 312*a-d* specifically refer to storage devices capable of maintaining data using SSD technology, other types of non-volatile storage devices may similarly be used in connection with one or more embodiments described here. In addition, while FIG. 3 shows an example in which four SSD devices 312*a-d* are available for allocation of computing resources, other implementations may include fewer or additional SSD devices. Moreover, in one or more embodiments, the server node 302 may include a combination of different types of non-volatile storage devices (e.g., SSD devices, flash memory, NAND memory, etc.)

In one or more embodiments, storage spaces of the SSD devices 312*a-d* may be divided into any number of partitioned spaces or allocations. For example, in one or more implementations, the SSD devices 312*a-d* may be partitioned into a number of storage namespaces (or simply "namespaces"). The namespaces may refer to discrete partitions of the storage on the SSD devices. The namespaces for a given SSD device may include partitions of uniform (or non-uniform) sizes (e.g., preconfigured partitions of storage). In one or more embodiments, the namespaces may be defined by the virtual machines 304*a-b* and/or hypervisor/OS on the host system 308.

In the example shown in FIG. 3, the SSD devices 312*a-d* each include four namespaces corresponding to partitions of data on the respective devices. For instance, as shown in FIG. 3, the first SSD device 312*a* includes four namespaces denoted as namespaces N0-N3. Similarly, the second SSD device 312*b* includes four namespaces denoted as namespaces N0-N3, the third SSD device 312*c* includes four namespaces denoted as namespaces N0-N3, and the fourth SSD device 312*d* includes four namespaces denoted as namespaces N0-N3. Other implementations may include SSD devices having fewer or additional namespaces. The different SSD devices may have different numbers of namespaces from one another. Further, the namespaces may be associated with storage spaces of similar or different sizes.

As shown in FIG. 3, the virtual machines 304*a-b* may be bound to one or more of the SSD devices 312*a-d*. More specifically, the host system 308 can facilitate establishing a binding (e.g., a physical function) between the virtual machines 304*a-d* and respective namespaces of the SSD devices 312*a-d*. In the example illustrated in FIG. 3, the first virtual machine 304*a* is associated with a first namespace (N0) of the first SSD device 312*a* via a first binding 314*a*. The first virtual machine 304*a* is also associated with a first namespace (N0) on the second SSD device 312*b* via a second binding 314*b*, a first namespace (N0) on the third SSD device 312*c* via a third binding 314*c*, and a first namespace (N0) on the fourth SSD device 312*d* via a fourth binding 314*d*. Each of the bindings 314*a-d* may refer to one of a number of different physical functions.

As further shown in the example illustrated in FIG. 3, the second virtual machine 304*b* is similarly associated with multiple SSD devices via respective bindings. In particular, as shown in FIG. 3, the second virtual machine 304*b* is associated with a second namespace (N1) on the third SSD device 312*c* via a first binding 316*a* and a second namespace (N1) on the fourth SSD device 312*d* via a second binding 316*b*. The bindings 316*a-b* of the second virtual machine 304*b* may be a similar or different type of physical function from the bindings 314*a-d* of the first virtual machine 304*a*.

As further shown, each of the SSD devices 312*a-d* provide connectivity to the host system 308 by way of PCIe links 318*a-d* between the respective SSD devices 312*a-d* and the root complex 310. For example, the first SSD device 312*a* is coupled to the root complex 310 via a first PCIe link 318*a*, the second SSD device 312*b* is coupled to the root complex 310 via a second PCIe link 318*b*, the third SSD device 312*c* is coupled to the root complex 310 via a third PCIe link 318*c*, and the fourth SSD device 312*d* is coupled to the root complex 310 via a fourth PCIe link 318*d*.

It is noted that each of the virtual machines 304*a-b* may have a different number of bindings for a variety of reasons. For instance, in one or more embodiments, the first virtual machine 304*a* and the second virtual machine 304*b* may refer to different virtual machine types or virtual machines from different virtual machine families and may be associated with different functions.

In addition, or as an alternative, the virtual machines 304*a-b* may have similar (or different) functions, but establish a different number of bindings in accordance with configuration data associated with the respective virtual machines 304*a-b*. For example, where a first virtual machine 304*a* is created based on configuration data that indicates a higher performance demand or a higher requirement for redundancy (e.g., 2*x* or 4*x* failover), the resulting set of bindings for the first virtual machine 304*a* may include a higher number of physical functions than a number of bindings for the second virtual machine 304*b*. This configuration may be implemented even where the second virtual machine 304*b* is a similar type of virtual machine or from a similar virtual machine family as the first virtual machine 304*a*.

In addition to determining or implementing a number of bindings in accordance with the configuration data, the configuration data may additionally influence the behavior of the virtual machine in connection with each of the SSD devices 312*a-d* via the respective bindings. As an example, where the configuration data for the first virtual machine 304*a* indicates that computing performance should be prioritized, the first virtual machine 304*a* may concurrently utilize each of the first namespaces of the SSD devices 312*a-d* in a way that maximizes throughput or processing speed. Alternatively, where the configuration data for the second virtual machine 304*b* indicates that redundancy should be prioritized, the second virtual machine 304*b* may cause data on the second namespaces of the third and fourth SSD devices 312*c-d* to maintain duplicative data to have 2× failover capacity.

As noted above, the configuration data may indicate a combination of different performance priorities. For example, the first virtual machine 304*a* may maximize processing throughput (or other computing performance metric) by concurrently accessing data on each of first namespaces of the SSD devices 312*a-d* or, alternatively, duplicate data across each of the first namespaces of the SSD devices 312*a-d*. Conversely, in one or more embodiments, the virtual volume manager 306*a* on the first virtual machine 304*a* may perform a combination of optimizations in accordance with the configuration data. For example, in accordance with the configuration data, the virtual volume manager 306*a* may cause data on the first namespace of both the first and second SSD devices 312a-b to be duplicated across the first namespace of both the third and fourth SSD devices 312c-d. Further in accordance with the configuration data, the virtual volume manager 306a can concurrently access data on the pairings of SSD devices 312a-d (e.g., a first pair of the first and second SSD devices 312a-b and a second pair of the third and fourth devices 312c-d) to boost computing performance.

Of note, the virtual volume managers 306a-b may implement features of the specific virtual machine configurations based on configuration data maintained thereon. In particular, rather than (or in addition to) maintaining the configuration data on the host system 308, the virtual volume managers 306a-b may maintain local control of the functionality and accessing the data on the SSD devices 312a-d.

Thus, independent of whether the configuration data indicates a priority on computing performance or redundancy, the virtual machines can locally manage access to the specific namespaces without querying or transmitting system calls to the hypervisor responsive to each access request. Rather, in accordance with one or more embodiments described herein, the hypervisor on the host system 308 can delegate functions of the virtual machines related to accessing and otherwise managing data on a select set of namespaces corresponding to the bindings without specifically authorizing or processing specific data requests. In one or more embodiments, the delegation of data management and other functions of the virtual machines 304a-b may be limited to actions taken by the virtual machines 304a-b in connection with the specific namespaces that have been virtualized to the virtual machines 304a-b via the corresponding physical functions (e.g., bindings).

Figure 4:
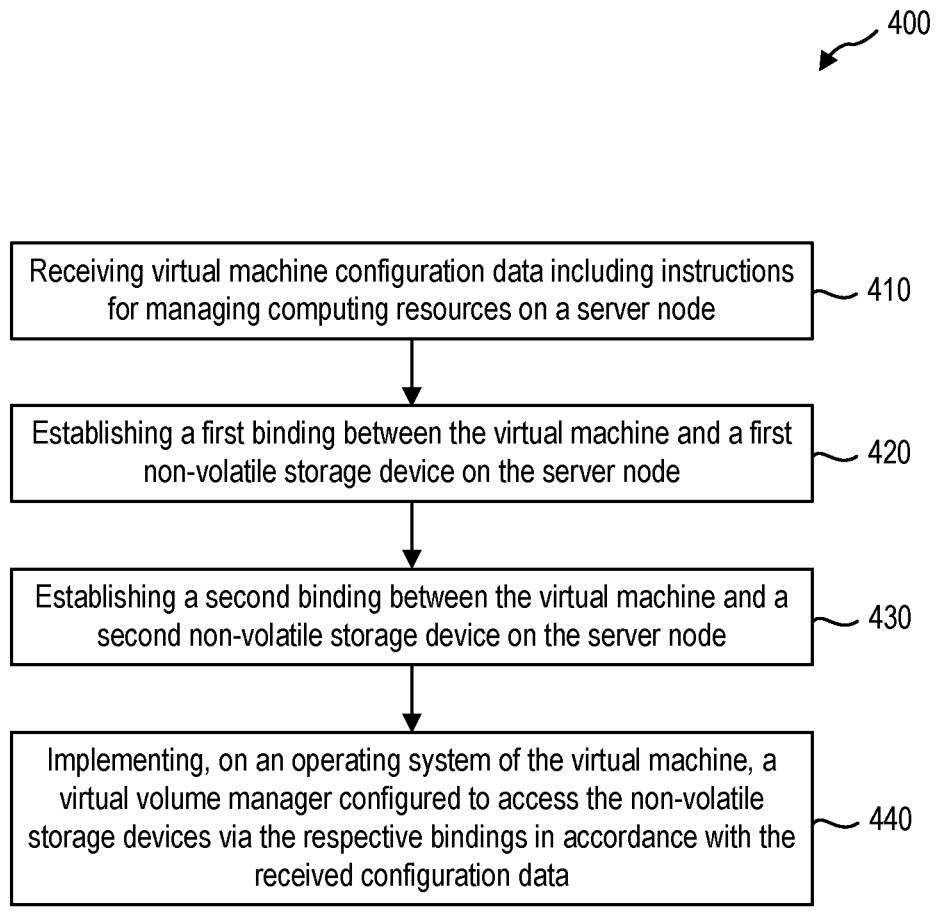
FIG. 4 illustrates a series of acts for virtualizing SSD devices on a virtual machine in accordance with one or more embodiments.

Turning now to FIG. 4, this figure illustrates example flowcharts including series of acts for binding virtual machines to storage spaces and implementing a virtual volume manager on the virtual machines in accordance with one or more embodiments described herein. While FIG. 4 illustrates acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can include instructions that, when executed by one or more processors, cause a computing device (e.g., a server device) to perform the acts of FIG. 4. In still further embodiments, a system can perform the acts of FIG. 4.

As indicated above, FIG. 4 illustrates a series of acts 400 for binding virtual machines to storage spaces and implementing a virtual volume manager on the virtual machine (e.g., operating system(s) of the virtual machines). As shown in FIG. 4, the series of acts 400 includes an act 410 of receiving virtual machine configuration data including instructions for managing computing resources on server nodes. For example, in one or more implementations, the act 410 involves receiving configuration data for a virtual machine where the configuration data includes instructions associated with managing computing resources on a plurality of non-volatile storage devices on a computing device.

As further shown in FIG. 4, the series of acts 400 includes an act 420 of establishing a first binding between the virtual machine and a first non-volatile storage device on the server node. For example, in one or more implementations, the act 420 includes establishing a first binding between the virtual machine and a first non-volatile storage device of the plurality of non-volatile storage devices. The series of acts 400 further includes an act 430 of establishing a second binding between the virtual machine and a second non-volatile storage device on the server node. For example, in one or more implementations, the act 430 of establishing a second binding between the virtual machine and a second non-volatile storage device of the plurality of non-volatile storage devices.

As further shown in FIG. 4, the series of acts 400 includes an act 440 of implementing, on an operating system of the virtual machine, a virtual volume manager configured to access the non-volatile storage devices via the respective bindings in accordance with the received configuration data. For example, in one or more implementations, the act 440 involves implementing a virtual volume manager on an operating system of the virtual machine where the virtual volume manager is configured to access the first non-volatile storage device and the second non-volatile storage device via the first and second bindings and in accordance with the received configuration data.

In one or more implementations, establishing the first binding includes binding the virtual machine to a first namespace associated with a partitioned portion of a first solid state storage (SSD) device. Further, in one or more implementations, establishing the second binding includes binding the virtual machine to a second namespace associated with a partitioned portion of a second SSD device. In one or more embodiments, the virtual volume manager is configured to provide a customer view including a single storage volume representative of a combination of the first namespace and the second namespace.

In one or more embodiments, establishing the first binding includes virtualizing at least a portion of the first non-volatile storage device to the virtual machine via a first physical function. Further, in one or more implementations, establishing the second binding includes virtualizing at least a portion of the second non-volatile storage device to the virtual machine via a second physical function. In one or more embodiments, the first physical function and the second physical function include one or more of a single root input/output (TO) virtualization physical function or a multi-physical function (MPF).

In one or more embodiments, the virtual volume manager is implemented locally on a guest operating system of the virtual machine. Further, the virtual machine may be implemented on the computing device including a hypervisor and host operating system. In one or more embodiments, the plurality of non-volatile storage devices includes a plurality of peripheral component interconnect express (PCIe) endpoints. For example, the first non-volatile storage device may include a first PCIe endpoint coupled to a root complex and the second non-volatile storage device may include a second PCIe endpoint coupled to the root complex.

In one or more embodiments, implementing the virtual volume manager enables the virtual machine to access computing resources on the first non-volatile storage device and the second non-volatile storage device without requesting access from a host operating system of the computing device for each access command.

In one or more embodiments, the configuration data includes instructions for prioritizing redundancy across the first non-volatile storage device and the second non-volatile storage device. In this example, implementing the virtual volume manager on the virtual machine causes data on the first non-volatile storage device to have redundancy on the second non-volatile storage device in accordance with the configuration data.

In one or more embodiments, the configuration data includes instructions for utilizing computing resources on both the first non-volatile storage device and the second non-volatile storage device to boost computing performance for the virtual machine. In this example, implementing the virtual volume manager on the virtual machine enables the virtual machine to concurrently utilize computing resources on the first non-volatile storage device and the second non-volatile storage device in accordance with the configuration data.

In one or more embodiments, the series of acts 400 includes establishing a third binding between the virtual machine and a third non-volatile storage device of the plurality of non-volatile storage devices and establishing a fourth binding between the virtual machine and a fourth non-volatile storage device of the plurality of non-volatile storage devices. In this example, the configuration data may include first instructions associated with prioritizing redundancy across multiple non-volatile storage devices and second instructions for utilizing computing resources on multiple non-volatile storage devices to boost computing performance. Further, implementing the virtual volume manager on the virtual machine may cause data on the first non-volatile storage device to have redundancy on the second non-volatile storage device in accordance with the first instructions of the configuration data. Implementing the virtual volume manager on the virtual machine may further cause the virtual machine to concurrently utilize computing resources on the third non-volatile storage device and the fourth non-volatile storage device in accordance with the second instructions of the configuration data.

Figure 5:
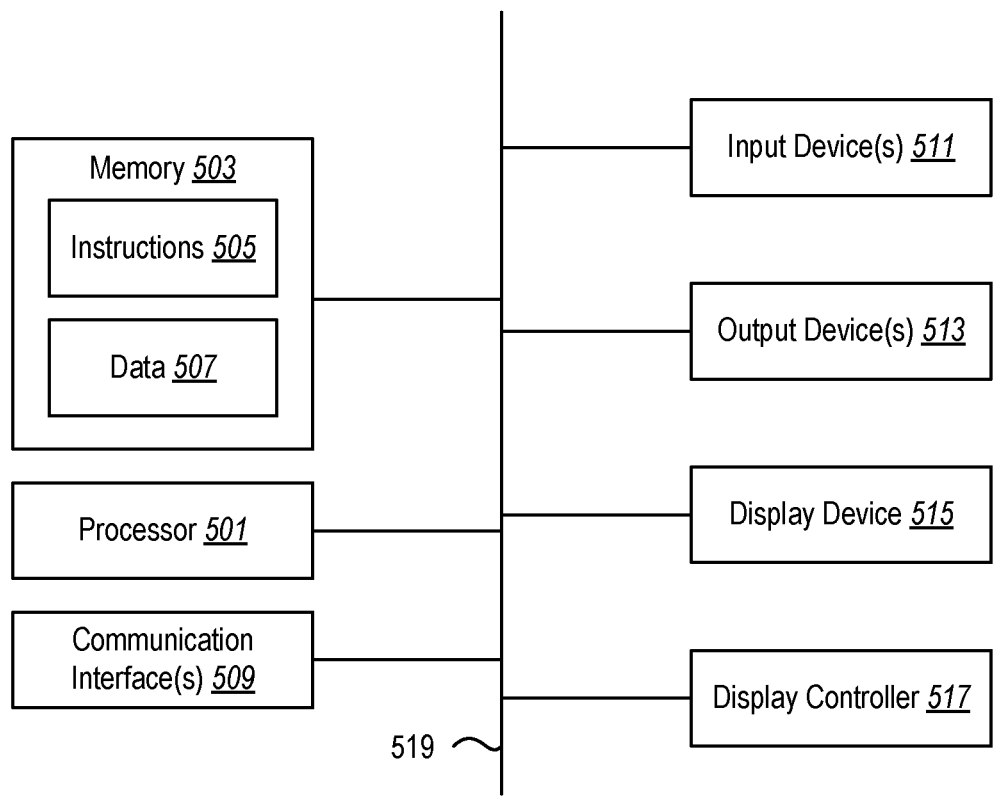
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    receiving configuration data for a virtual machine, the configuration data including instructions associated with managing computing resources on a plurality of non-volatile storage devices on a computing device;
    establishing a first binding between the virtual machine and a first namespace associated with a first partitioned portion of a first non-volatile storage device of the plurality of non-volatile storage devices by delegating permissions to the virtual machine to access the first partitioned portion independent from a hypervisor on the computing device, the first partitioned portion including at least one pre-configured partition of storage on the first non-volatile storage device;
    establishing a second binding between the virtual machine and a second namespace associated with a second partitioned portion of a second non-volatile storage device of the plurality of non-volatile storage devices by delegating permissions to the virtual machine to access the second partitioned portion independent from the hypervisor, the second partitioned portion including at least one preconfigured partition of storage on the second non-volatile storage device; and
    implementing a virtual volume manager on an operating system of the virtual machine, the virtual volume manager being configured to, in accordance with the received configuration data, access the first partitioned portion of the first non-volatile storage device via the first binding and the second partitioned portion of the second non-volatile storage device via the second binding.

2. The method of claim 1,
    wherein establishing the first binding includes binding the virtual machine to the first namespace associated with a pre-configured partitioned portion of a first solid state storage (SSD) device, and
    wherein establishing the second binding includes binding the virtual machine to the second namespace associated with a pre-configured partitioned portion of a second SSD device.

3. The method of claim 2, wherein the virtual volume manager is configured to provide a customer view including a single storage volume representative of a combination of the first namespace and the second namespace.

4. The method of claim 1,
    wherein establishing the first binding includes virtualizing at least a portion of the first non-volatile storage device to the virtual machine via a first physical function, and
    wherein establishing the second binding includes virtualizing at least a portion of the second non-volatile storage device to the virtual machine via a second physical function.

5. The method of claim 4, wherein the first physical function and the second physical function include one or more of:
    a single root input/output (IO) virtualization physical function; or
    a multi-physical function.

6. The method of claim 1, wherein the virtual volume manager is implemented locally on a guest operating system of the virtual machine, and wherein the virtual machine is implemented on the computing device including the hypervisor and a host operating system.

7. The method of claim 1, wherein the plurality of non-volatile storage devices includes a plurality of peripheral component interconnect express (PCIe) endpoints, the first non-volatile storage device including a first PCIe endpoint coupled to a root complex and the second non-volatile storage device including a second PCIe endpoint coupled to the root complex.

8. The method of claim 1, wherein delegating the permissions to the virtual machine to access the first partitioned portion and the second partitioned portion independent from the hypervisor enables the virtual machine to access computing resources on the first non-volatile storage device and the second non-volatile storage device without requesting access from the hypervisor implemented on a host operating system of the computing device for each access command.

9. The method of claim 1, wherein the configuration data includes instructions for prioritizing redundancy across the first non-volatile storage device and the second non-volatile storage device, and wherein implementing the virtual volume manager on the virtual machine causes data on the first non-volatile storage device to have redundancy on the second non-volatile storage device in accordance with the configuration data.

10. The method of claim 1, wherein the configuration data includes instructions for utilizing computing resources on both the first non-volatile storage device and the second non-volatile storage device to boost computing performance for the virtual machine, and wherein implementing the virtual volume manager on the virtual machine enables the virtual machine to concurrently utilize computing resources on the first non-volatile storage device and the second non-volatile storage device in accordance with the configuration data.

11. The method of claim 1, further comprising:
establishing a third binding between the virtual machine and a third non-volatile storage device of the plurality of non-volatile storage devices; and
establishing a fourth binding between the virtual machine and a fourth non-volatile storage device of the plurality of non-volatile storage devices.

12. The method of claim 11,
wherein the configuration data includes first instructions associated with prioritizing redundancy across multiple non-volatile storage devices and second instructions for utilizing computing resources on multiple non-volatile storage devices to boost computing performance, and
wherein implementing the virtual volume manager on the virtual machine:
causes data on the first non-volatile storage device to have redundancy on the second non-volatile storage device in accordance with the first instructions of the configuration data; and
causes the virtual machine to concurrently utilize computing resources on the third non-volatile storage device and the fourth non-volatile storage device in accordance with the second instructions of the configuration data.

13. The method of claim 1, wherein the first non-volatile storage device comprises a plurality of partitioned portions having uniform sizes including the at least one partitioned portion of storage on the first non-volatile storage device.

14. The method of claim 1, wherein the first non-volatile storage device comprises a plurality of partitioned portions having non-uniform sizes including the at least one partitioned portion of storage on the first non-volatile storage device.

15. A system, comprising:
one or more processors;
memory in electronic communication with the one or more processors; and
instructions stored in memory, the instructions being executable by the one or more processors to:
receive configuration data for a virtual machine, the configuration data including instructions associated with managing computing resources on a plurality of non-volatile storage devices on a computing device;
establish a first binding between the virtual machine and a first namespace associated with a first partitioned portion of a first non-volatile storage device of the plurality of non-volatile storage devices by delegating permissions to the virtual machine to access the first partitioned portion independent from a hypervisor on the computing device, the first partitioned portion including one or more pre-configured partitions of storage on the first non-volatile storage device;
establish a second binding between the virtual machine and a second namespace associated with a second partitioned portion of a second non-volatile storage device of the plurality of non-volatile storage devices by delegating permissions to the virtual machine to access the first partitioned portion independent from the hypervisor, the second partitioned portion including one or more pre-configured partitions of storage on the second non-volatile storage device; and
implement a virtual volume manager on an operating system of the virtual machine, the virtual volume manager being configured to, in accordance with the received configuration data, access the first partitioned portion of the first non-volatile storage device via the first binding and the second partitioned portion of the second non-volatile storage device via the second binding.

16. The system of claim 15,
wherein establishing the first binding includes binding the virtual machine to the first namespace associated with a pre-configured partitioned portion of a first solid state storage (SSD) device, and
wherein establishing the second binding includes binding the virtual machine to the second namespace associated with a pre-configured partitioned portion of a second SSD device.

17. The system of claim 15,
wherein establishing the first binding includes virtualizing at least a portion of the first non-volatile storage device to the virtual machine via a first physical function,
wherein establishing the second binding includes virtualizing at least a portion of the second non-volatile storage device to the virtual machine via a second physical function, and
wherein the first physical function and the second physical function include one or more of:
a single root input/output (IO) virtualization physical function; or
a multi-physical function.

18. The system of claim 15, wherein delegating the permissions to the virtual machine to access the first partitioned portion and the second partitioned portion independent from the hypervisor enables the virtual machine to access computing resources on the first non-volatile storage device and the second non-volatile storage device without requesting access from the hypervisor implemented on a host operating system of the computing device for each access command.

19. A non-transitory computer readable medium storing instructions thereon that, when executed by at least one processor, cause a computing device to:
receive configuration data for a virtual machine, the configuration data including instructions associated with managing computing resources on a plurality of non-volatile storage devices on a computing device;
establish a first binding between the virtual machine and a first namespace associated with a first partitioned portion of a first non-volatile storage device of the plurality of non-volatile storage devices by delegating permissions to the virtual machine to access the first partitioned portion independent from a hypervisor on the computing device, the first partitioned portion including one or more pre-configured partitions of storage on the first non-volatile storage device;
establish a second binding between the virtual machine and a second namespace associated with a second partitioned portion of a second non-volatile storage device of the plurality of non-volatile storage devices by delegating permissions to the virtual machine to access the second partitioned portion independent from the hypervisor, the second partitioned portion including one or more pre-configured partitions of storage on the second non-volatile storage device; and
implement a virtual volume manager on an operating system of the virtual machine, the virtual volume manager being configured to, in accordance with the received configuration data, access the first partitioned portion of the first non-volatile storage device via the first binding and the second partitioned portion of the second non-volatile storage device via the second binding.

20. The non-transitory computer readable medium of claim 19,
wherein establishing the first binding includes binding the virtual machine to the first namespace associated with a pre-configured partitioned portion of a first solid state storage (SSD) device, and
wherein establishing the second binding includes binding the virtual machine to the second namespace associated with a pre-configured partitioned portion of a second SSD device.

* * * * *